United States Patent
Kim et al.

(10) Patent No.: US 11,337,167 B2
(45) Date of Patent: May 17, 2022

(54) METHOD FOR TRANSMITTING OR RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Youngtae Kim, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/279,404

(22) PCT Filed: Sep. 6, 2019

(86) PCT No.: PCT/KR2019/011568
§ 371 (c)(1),
(2) Date: Mar. 24, 2021

(87) PCT Pub. No.: WO2020/067656
PCT Pub. Date: Apr. 2, 2020

(65) Prior Publication Data
US 2022/0007307 A1    Jan. 6, 2022

(30) Foreign Application Priority Data
Sep. 28, 2018   (KR) .................. 10-2018-0116493

(51) Int. Cl.
*H04W 52/36*    (2009.01)
*H04W 52/14*    (2009.01)
(Continued)

(52) U.S. Cl.
CPC ......... *H04W 52/367* (2013.01); *H04W 52/14* (2013.01); *H04W 52/24* (2013.01); *H04W 52/46* (2013.01); *H04W 84/04* (2013.01)

(58) Field of Classification Search
CPC ... H04W 52/14; H04W 52/367; H04W 52/24; H04B 17/345
(Continued)

(56) References Cited

U.S. PATENT DOCUMENTS 10,506,521 B2 * 12/2019 Oh .................. H04L 1/1861
2011/0003557 A1 * 1/2011 Morita ............... H04W 52/143
455/67.11
(Continued)

FOREIGN PATENT DOCUMENTS

KR    1020100053360 A    5/2010
KR    1020120039419 A    4/2012
KR    1020130006879 A    1/2013

OTHER PUBLICATIONS

Huawei, HiSilicon, "Physical layer design for NR IAB", 3GPP TSG RAN WG1 Meeting #94, Aug. 20-24, 2018, R1-1808101.

*Primary Examiner* — John J Lee
(74) *Attorney, Agent, or Firm* — Dentons US LLP

(57) ABSTRACT

The present invention relates to a wireless communication system and, specifically, provides a communication method and an apparatus therefor, in which: transmission power information relating to a first downlink (DL) signal is received from a parent node; the first DL signal is transmitted to a child node on the basis of the transmission power information; a first uplink (UL) signal is transmitted to the parent node on the basis of the transmission power information; the first DL signal and the first UL signal are multiplexed by frequency division multiplexing (FDM) or spatial division multiplexing (SDM); the transmission power information includes a maximum transmission power value of the first DL signal; and a magnitude of a transmission power of one of the first DL signal and the first UL signal is adjusted so that the magnitude of the transmission power of the first DL signal and the magnitude of the (Continued)

transmission power of the first UL signal do not differ by a value equal to or greater than threshold value.

12 Claims, 13 Drawing Sheets

(51) Int. Cl.
    *H04W 52/24*     (2009.01)
    *H04W 52/46*     (2009.01)
    *H04W 84/04*     (2009.01)

(58) Field of Classification Search
    USPC ................................ 455/522, 69, 452.1, 509
    See application file for complete search history.

(56) References Cited

U.S. PATENT DOCUMENTS

| | | | |
|---|---|---|---|
| 2012/0178482 A1* | 7/2012 | Seo | ........................ H04L 1/1854 |
| | | | 455/501 |
| 2013/0051259 A1* | 2/2013 | Kim | .................... H04W 52/365 |
| | | | 370/252 |
| 2018/0092139 A1 | 3/2018 | Novlan et al. | |

* cited by examiner

[Fig. 1]
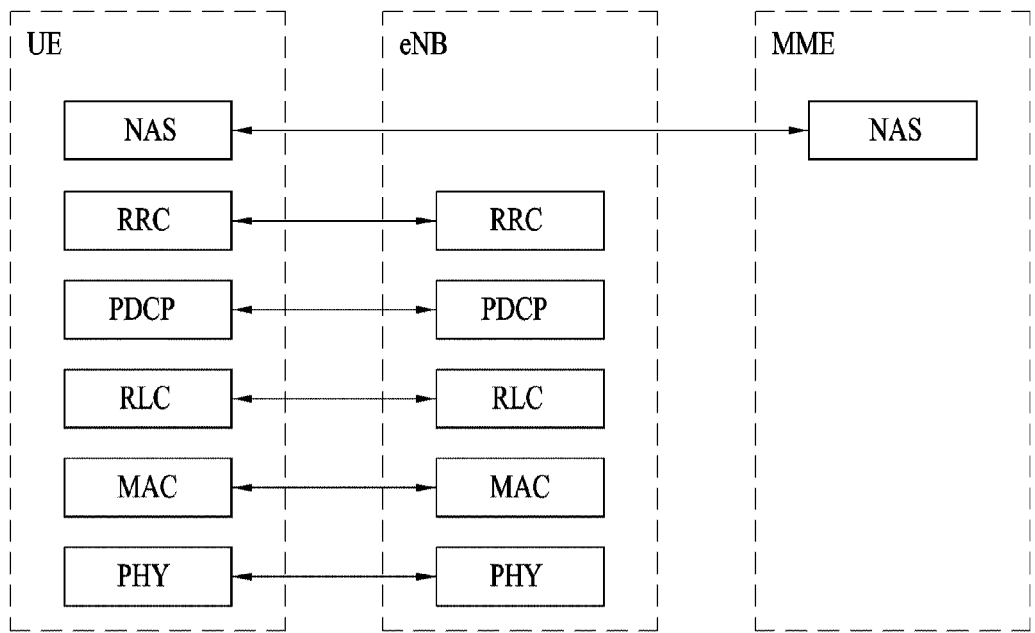
(A) CONTROL-PLANE PROTOCOL STACK
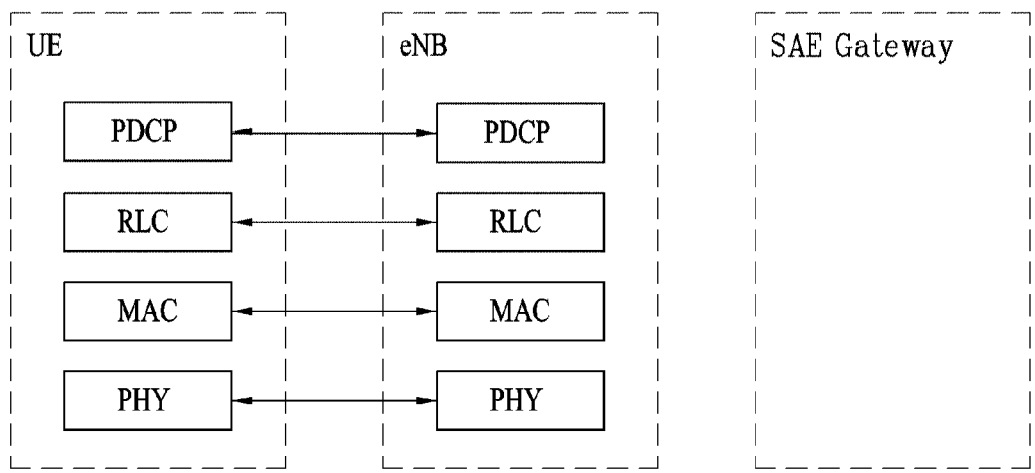
(B) USER-PLANE PROTOCOL STACK

[Fig. 2]
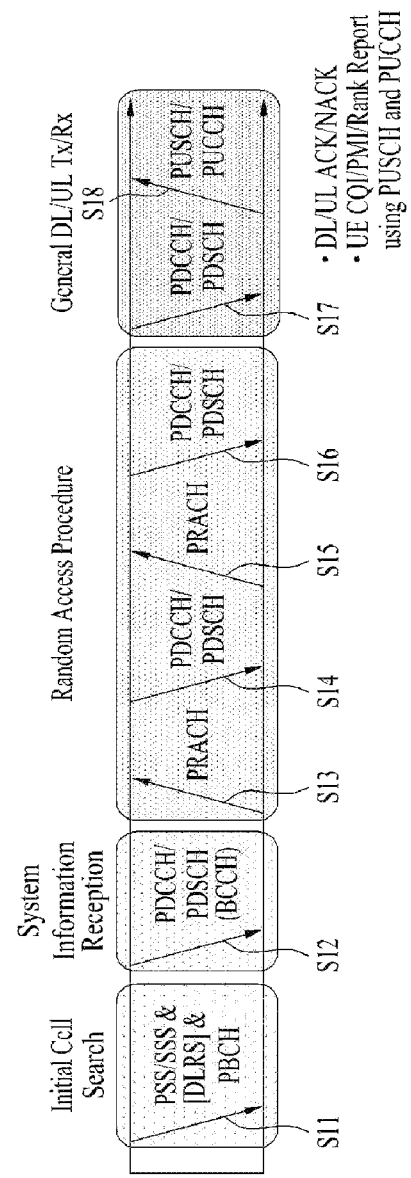

[Fig. 3]
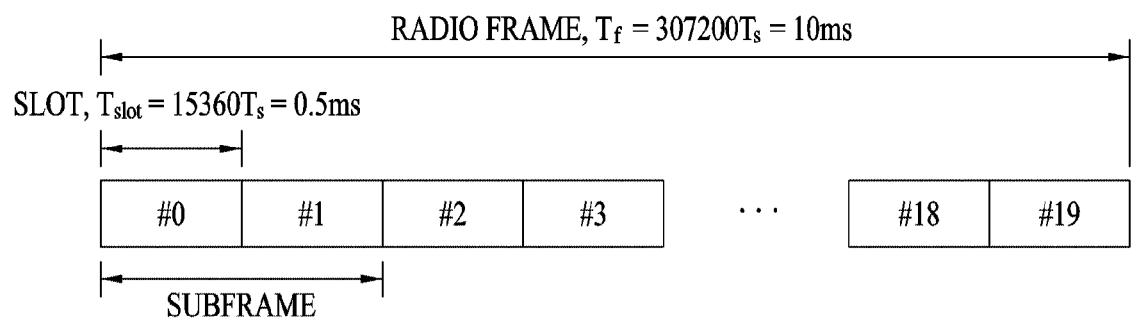

[Fig. 4]
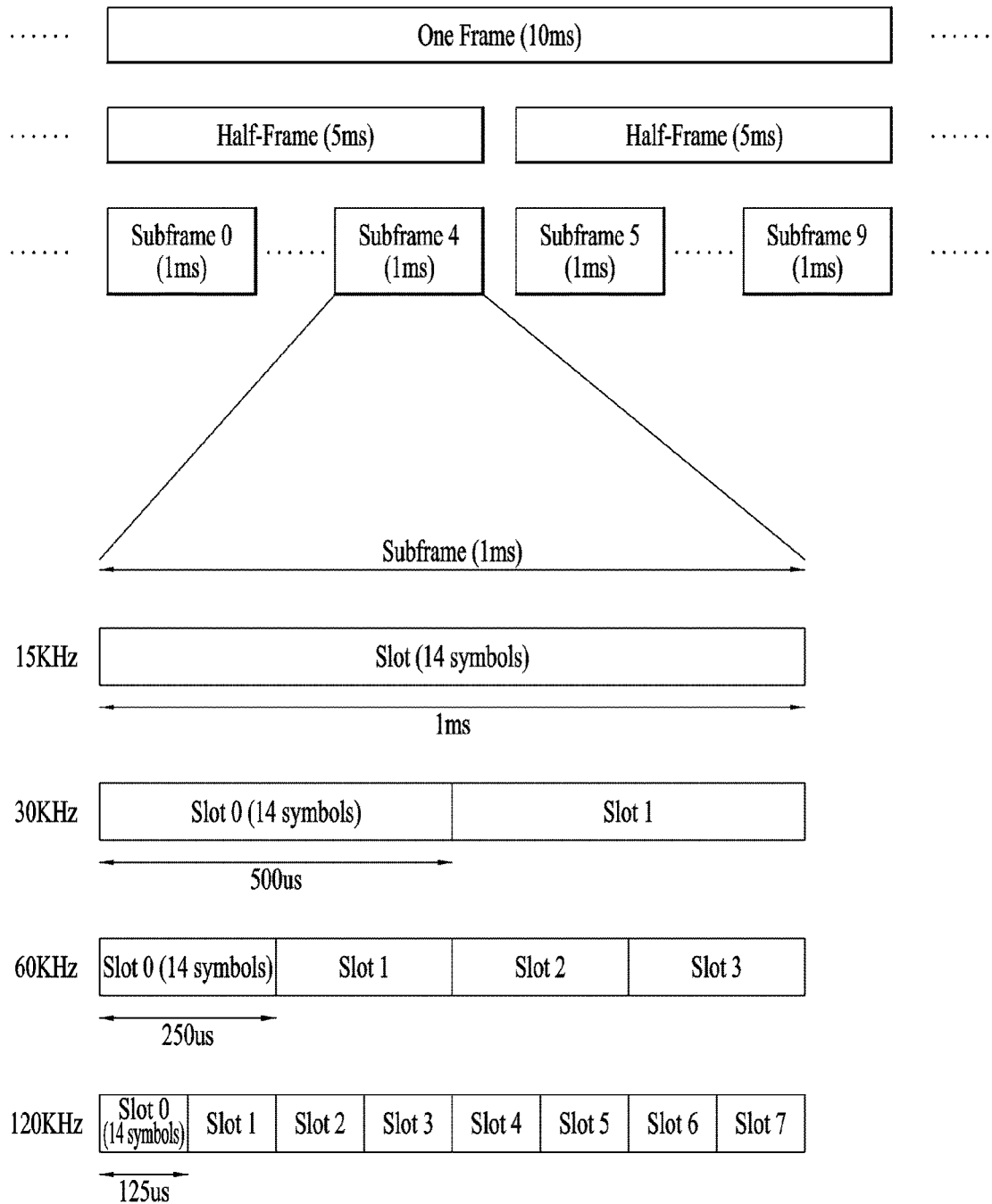

[Fig. 5]
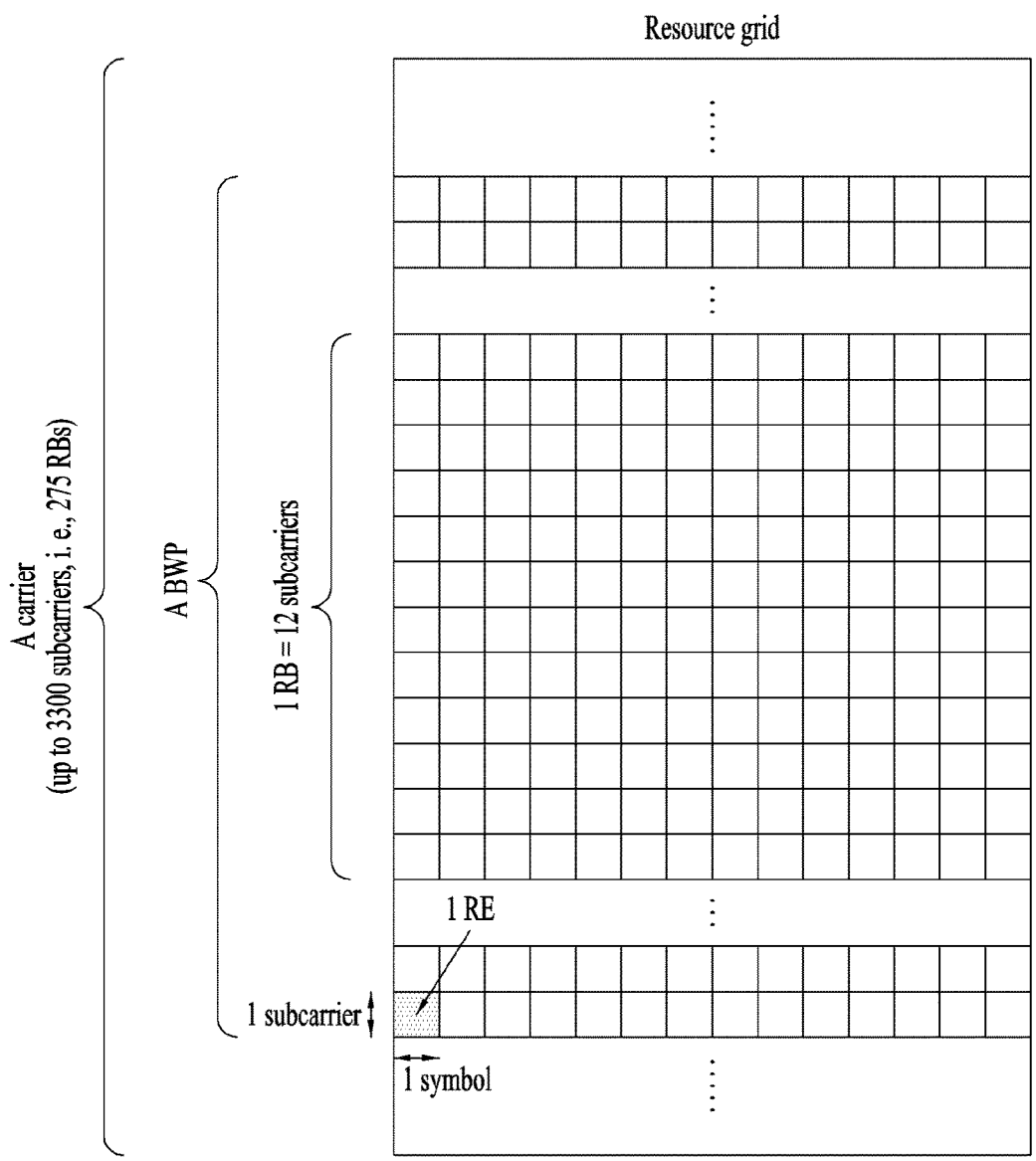

[Fig. 6]
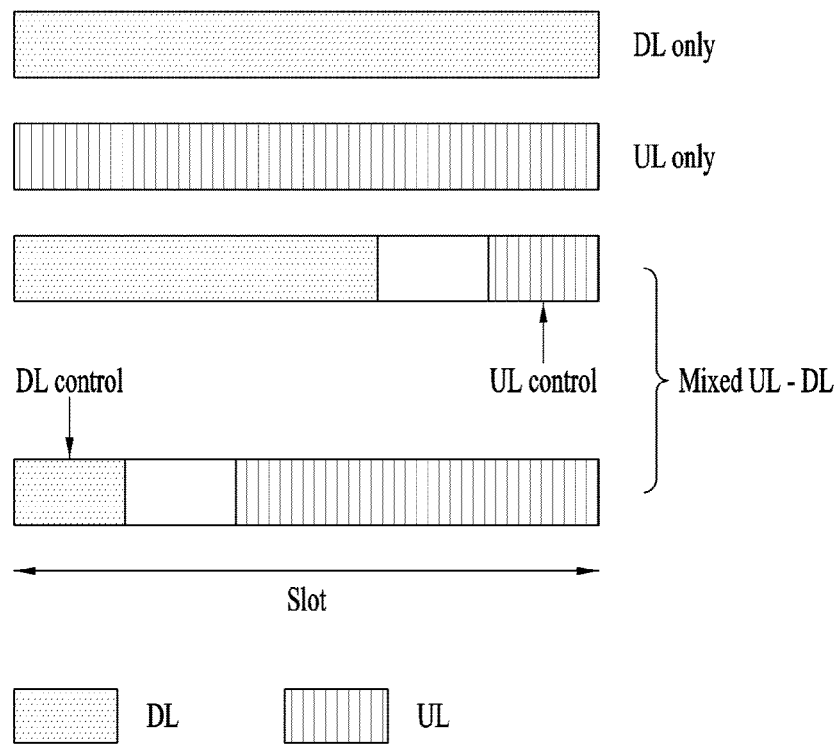

[Fig. 7]
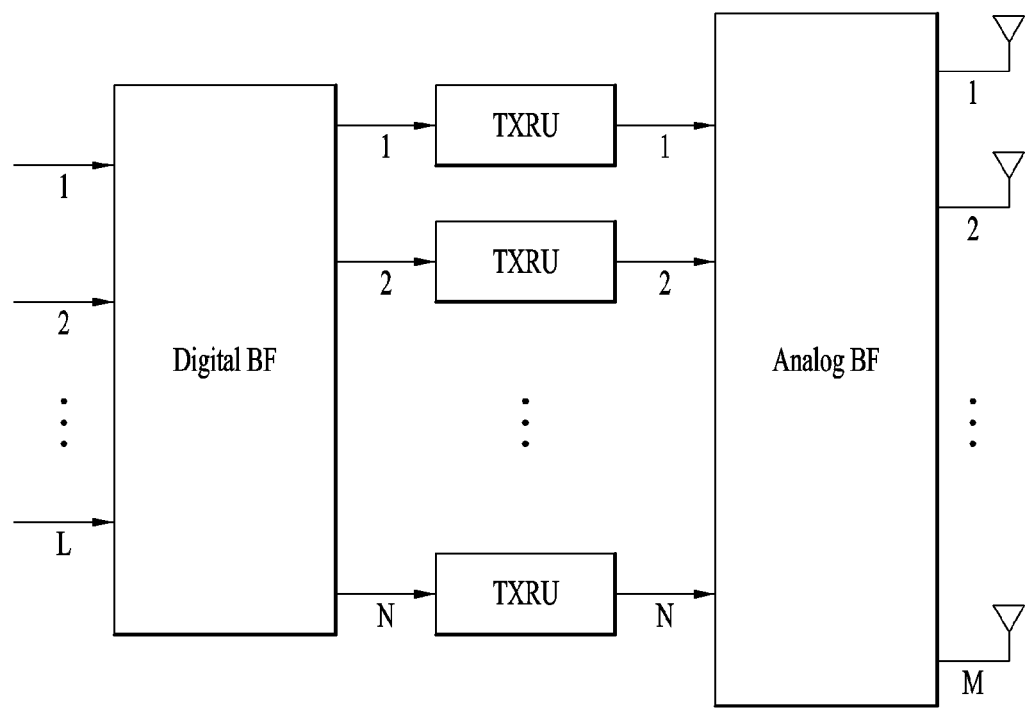

[Fig. 8]
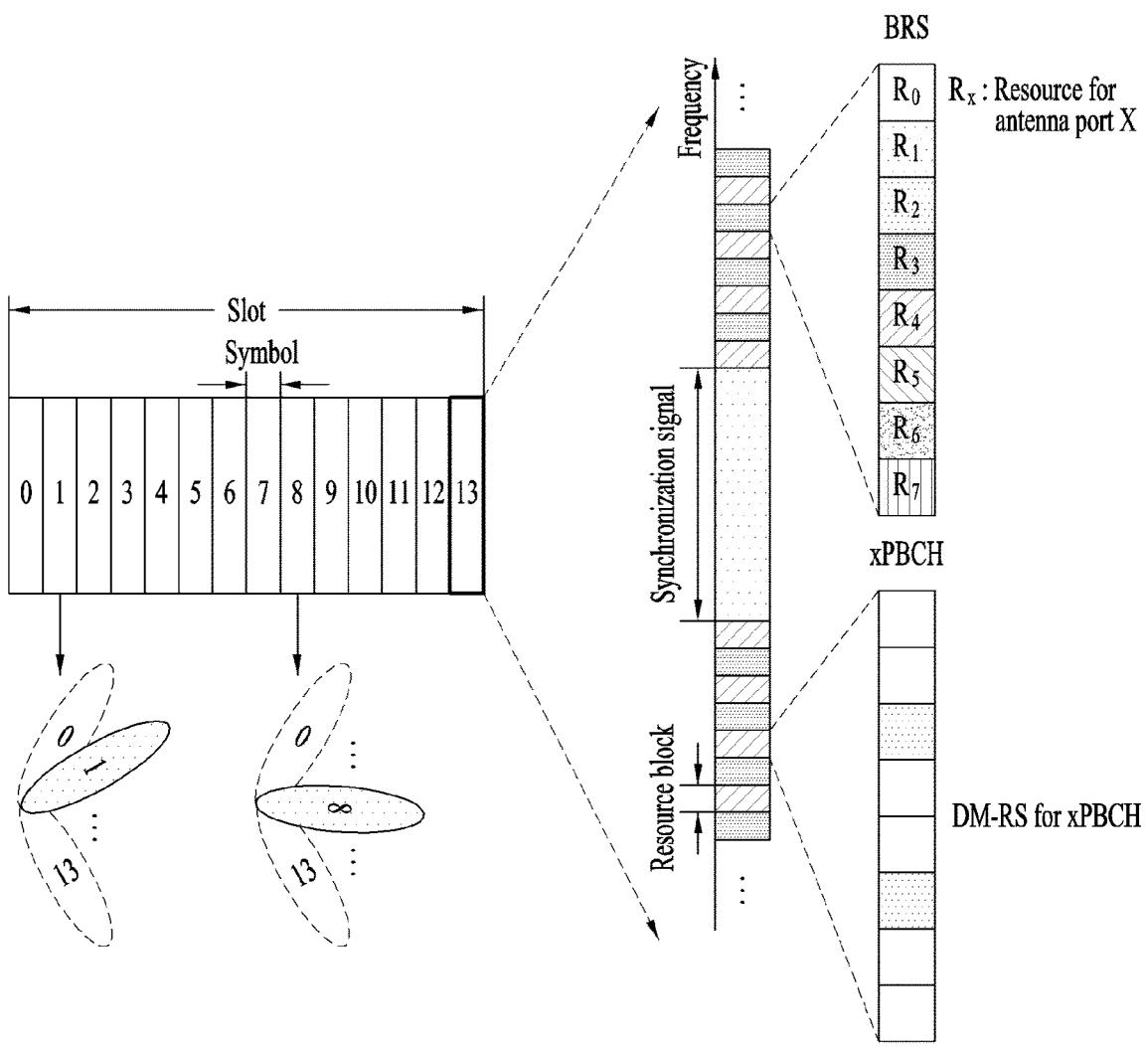

[Fig. 9]
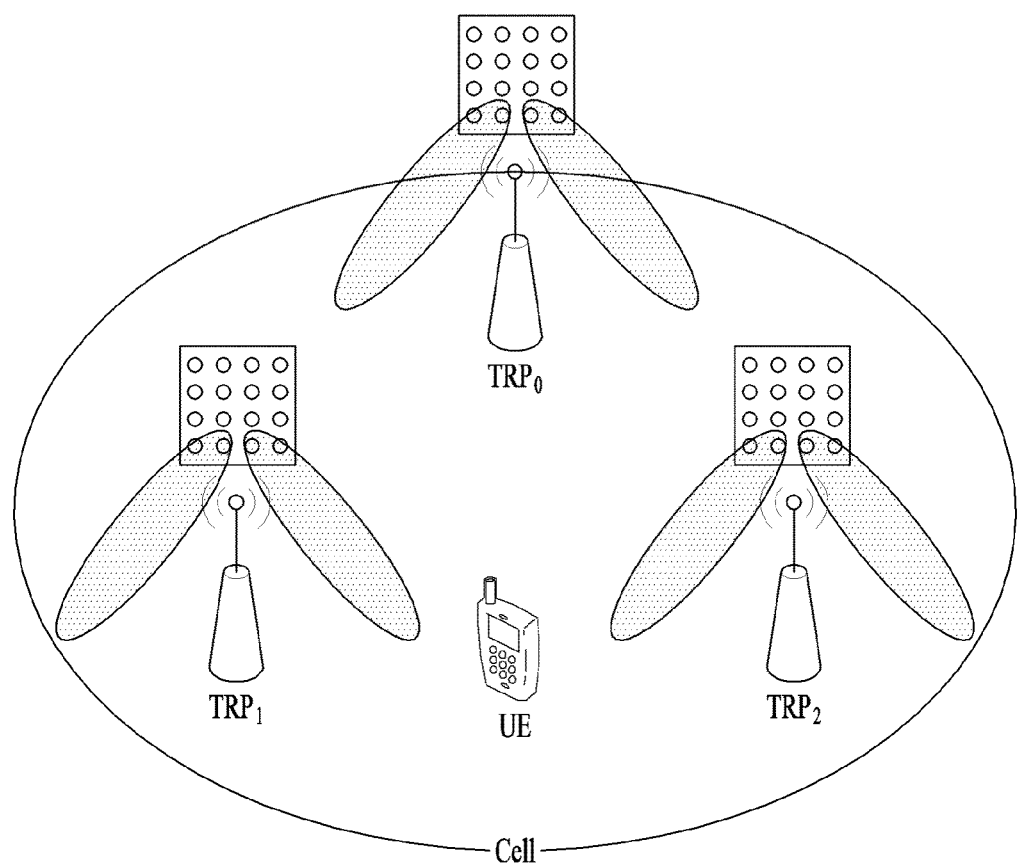

[Fig. 10]
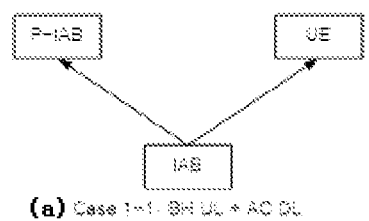
(a) Case 1-1: BH UL + AC DL
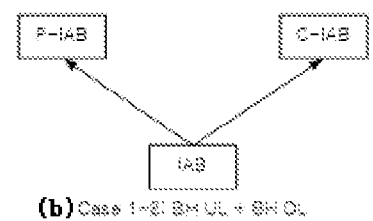
(b) Case 1-2: BH UL + BH DL
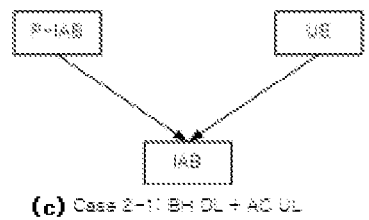
(c) Case 2-1: BH DL + AC UL
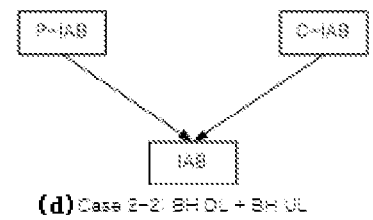
(d) Case 2-2: BH DL + BH UL

[Fig. 11]
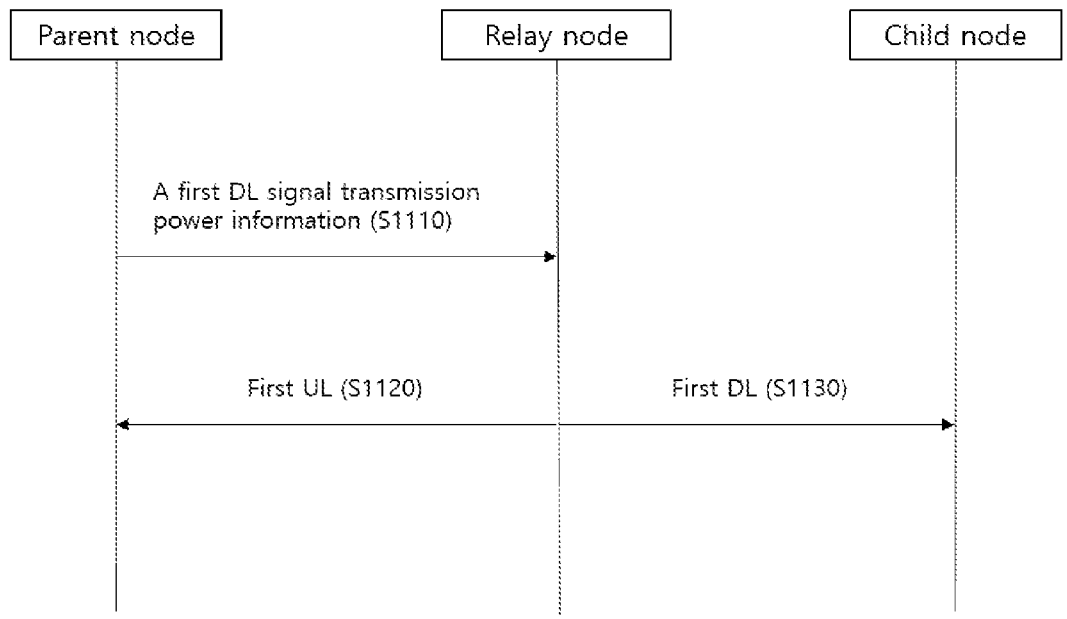
[Fig. 12]
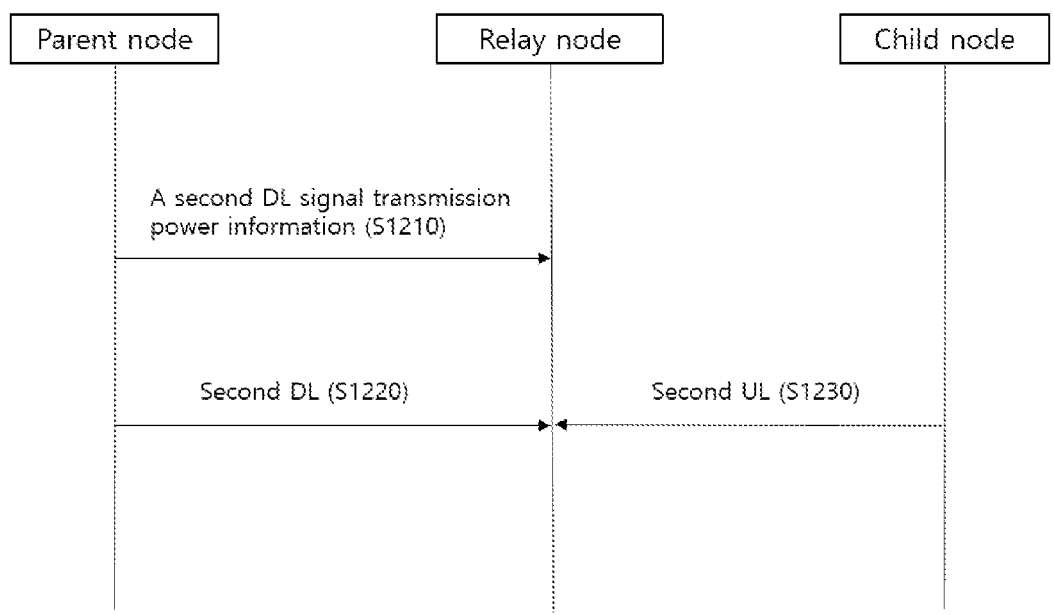

[Fig. 13]
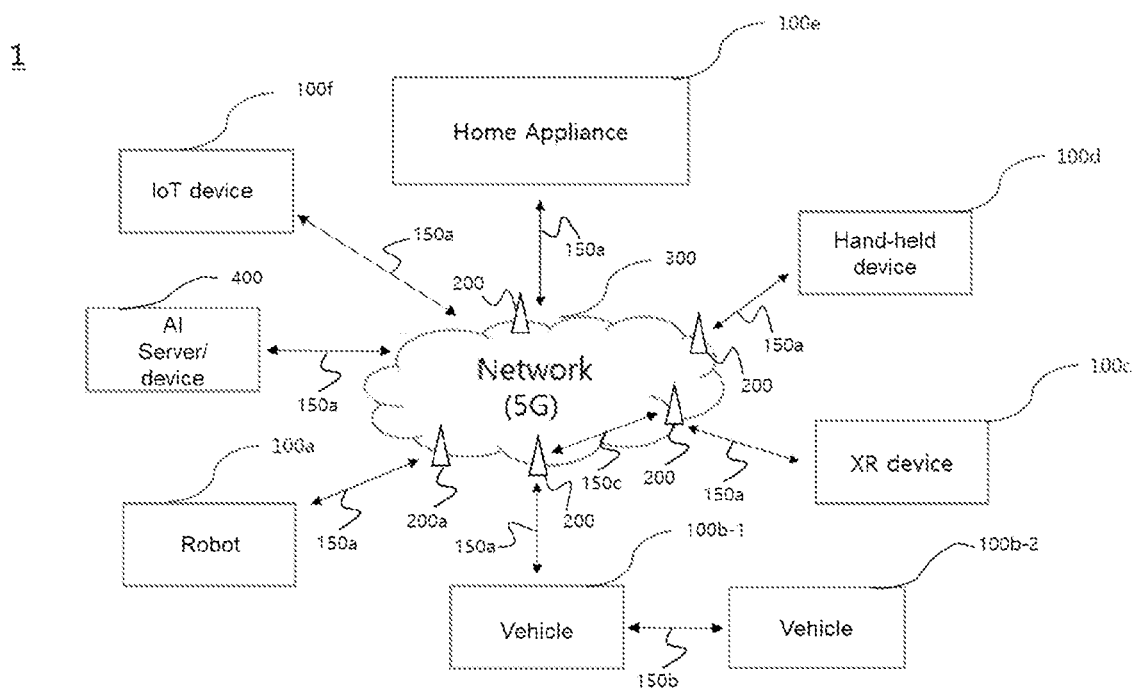
[Fig. 14]
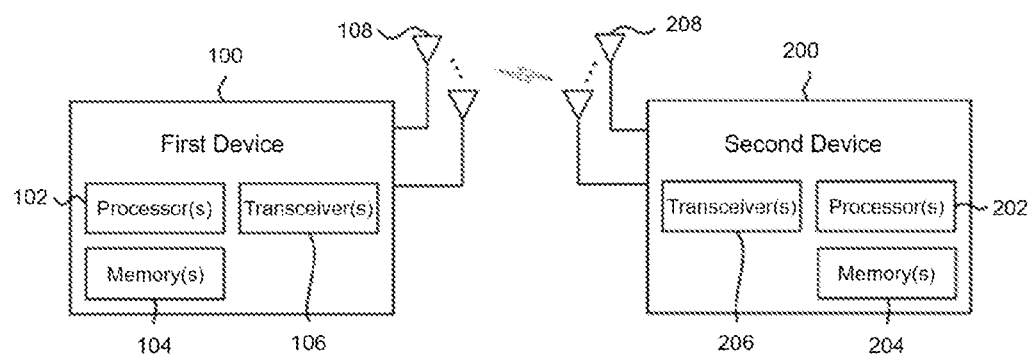

[Fig. 15]
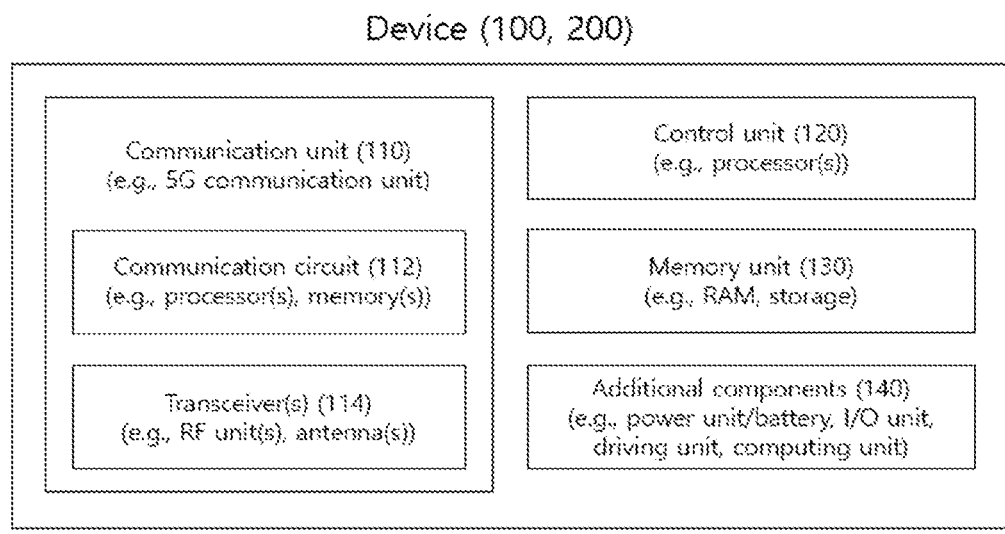
[Fig. 16]
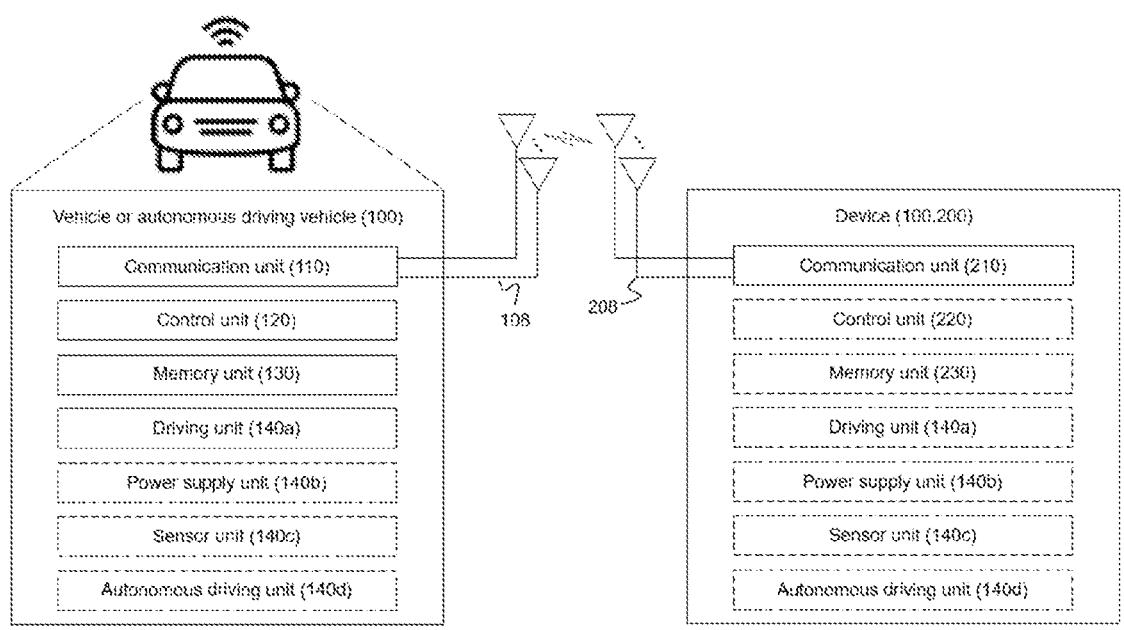

METHOD FOR TRANSMITTING OR RECEIVING SIGNAL IN WIRELESS COMMUNICATION SYSTEM AND APPARATUS SUPPORTING SAME

This application is the National Stage filing under 35 U.S.C. 371 of International Application No. PCT/KR2019/011568, filed on Sep. 6, 2019, which claims the benefit of Korean Patent Application No. 10-2018-0116493, filed on Sep. 28, 2018, the contents of which are all hereby incorporated by reference herein in their entirety.

TECHNICAL FIELD

The present disclosure relates to a method and apparatus used in a wireless communication system, and more particularly, to a method and apparatus for transmitting and receiving a signal in a next-generation communication system.

BACKGROUND ART

The necessity for mobile broadband communication more improved than the conventional radio access technology (RAT) has increased as a number of communication devices have required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

The present disclosure is intended to provide a method and apparatus for transmitting and receiving a signal in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

According to an aspect of the present disclosure, a communication method of a relay node in a wireless communication system includes receiving transmission power information related to a first downlink (DL) signal from a parent node, transmitting the first DL signal to a child node based on the transmission power information, and transmitting a first uplink (UL) signal to the parent node based on the transmission power information. The first DL signal and the first UL signal are multiplexed in frequency division multiplexing (FDM) or spatial division multiplexing (SDM), the transmission power information includes a maximum transmission power value of the first DL signal, and the magnitude of transmission power of one of the first DL signal and the first UL signal is controlled to prevent the difference between the magnitude of the transmission power of the first DL signal and the magnitude of the transmission power of the first UL signal from being equal to or larger than a threshold.

According to an aspect of the present disclosure, a relay node used in a wireless communication system includes a memory and a processor. The processor is configured to receive transmission power information related to a first DL signal from a parent node, transmit the first DL signal to a child node based on the transmission power information, and transmit a first UL signal to the parent node based on the transmission power information. The first DL signal and the first UL signal are multiplexed in FDM or SDM, the transmission power information includes a maximum transmission power value of the first DL signal, and the magnitude of transmission power of one of the first DL signal and the first UL signal is controlled to prevent the difference between the magnitude of the transmission power of the first DL signal and the magnitude of the transmission power of the first UL signal from being equal to or larger than a threshold.

The one of the first DL signal and the first UL signal may be configured by a higher-layer signal.

The transmission power information may include the type of the first DL signal to which the maximum transmission power value is applied, and the type may include at least one of a DL signal for synchronization or a DL signal for channel measurement.

A transmission power value of a second DL signal may be received from the parent node, and the second DL signal transmitted with the transmission power value may be received from the parent node.

The transmission power value of the second DL signal may be applied to a signal other than a DL signal for synchronization or a DL signal for channel measurement.

The relay node may be an integrated access and backhaul (IAB) node.

Further, the relay node may include an autonomous driving vehicle.

The above aspects of the present disclosure are merely a part of preferred embodiments of the present disclosure, and various embodiments reflecting the technical features of the present disclosure may be derived and understood from the following detailed description of the present disclosure by those skilled in the art.

Advantageous Effects

According to embodiments of the present disclosure, when a relay node transmits and receives signals to and from a parent node and a child node in a next-generation communication system, interference between signals may be minimized According to embodiments of the present disclosure, the effect of interference between signals may be minimized by controlling the transmission power of a downlink signal transmitted from a parent node to a relay node or from the relay node to a child node in a next-generation communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the present disclosure and together with the description serve to explain the principle of the present disclosure.

FIG. 1 is a diagram illustrating the architecture of control-plane and user-plane radio interface protocols between a user equipment (UE) and an evolved UMTS terrestrial radio access network (E-UTRAN) based on a 3rd generation partnership project (3GPP) radio access network standard.

FIG. 2 is a diagram illustrating physical channels and a signal transmission method using the physical channels.

FIG. 3 is a diagram illustrating radio frame structures in a long term evolution (LTE) system.

FIG. 4 is a diagram illustrating a radio frame structure in a NR system.

FIG. 5 is a diagram illustrating a slot structure in the NR system.

FIG. 6 is a diagram illustrating self-contained slot structures in the NR system.

FIG. 7 is a diagram illustrating a hybrid beamforming structure from the perspective of transceiver units (TXRUs) and physical antennas.

FIG. 8 is a diagram illustrating a beam sweeping operation for a synchronization signal and system information in a downlink transmission procedure.

FIG. 9 is a diagram illustrating an exemplary cell in a new radio access technology (NR) system.

FIGS. 10, 11 and 12 are diagrams illustrating a method of transmitting and receiving a signal according to an embodiment of the present disclosure.

FIG. 13 is a diagram illustrating an exemplary communication system applicable to the present disclosure.

FIG. 14 is a block diagram illustrating an example of wireless devices applicable to the present disclosure.

FIG. 15 is a block diagram illustrating another example of wireless devices applicable to the present disclosure.

FIG. 16 is a block diagram of an exemplary vehicle or autonomous driving vehicle applicable to the present disclosure.

BEST MODE

While embodiments of the present disclosure are described herein in the context of long term evolution (LTE), LTE-advanced (LTE-A), and new RAT (NR) systems, these systems are exemplary.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a mobile station (MS). The BS is a terminal node of a network, which communicates directly with an MS. In some cases, a specific operation described as performed by the BS may be performed by an upper node of the BS.

That is, in the network including a plurality of network nodes including the BS, various operations performed for communication with the MS may be performed by the BS or network nodes other than the BS. In the present disclosure, the term BS may be replaced with the term fixed station, Node B, evolved Node B (eNode B or eNB), gNode B (gNB), advanced base station (ABS), or access point. Further, the term BS may cover remote radio head (RRH), eNB, transmission point (TP), reception point (RP), and relay in its broad sense.

In the embodiments of the present disclosure, the term terminal may be replaced with the term user equipment (UE), MS, subscriber station (SS), mobile subscriber station (MSS), mobile terminal, or advanced mobile station (AMS).

A transmitter refers to a fixed node and/or a mobile node which provides data service or voice service, and a receiver refers to a fixed node and/or a mobile node which receives data service or voice service. On uplink (UL), therefore, an MS may serve as a transmitter and a BS may serve as a receiver, whereas on downlink (DL), the MS may serve as a receiver and the BS may server as a transmitter.

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA).

CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA).

UTRA is a part of universal mobile telecommunications system (UMTS). 3rd generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

The present disclosure will be described in the context of a 3GPP communication system (e.g., LTE or NR), for clarity of description, which should not be construed as limiting the technical idea of the present disclosure.

The 3GPP communication standards define DL physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNB and a UE. For example, cell specific RS, UE-specific RS (UE-RS), positioning RS (PRS), and channel state information RS (CSI-RS) are defined as DL RSs. The 3GPP LTE/LTE-A standards define UL physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and demodulation reference signal (DMRS) for a UL control/data signal, and sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, when it is said that a UE transmits a PUCCH/PUSCH/PRACH, this means that UCI/UL data/a random access signal is transmitted on or through the PUCCH/PUSCH/PRACH. Further, when it is said that a BS transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a diagram illustrating the architecture of control-plane and user-plane radio interface protocols between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an OFDMA scheme in DL and is modulated using a SC-FDMA scheme in UL.

Layer 2 (i.e. L2) of the 3GPP LTE/LTE-A system is split into the following sublayers: medium access control (MAC), radio link control (RLC), and packet data convergence protocol (PDCP). The MAC layer of a second layer (Layer 2 or L2) provides a service to an RLC layer of a higher layer via a logical channel The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: radio resource control (RRC) and non-access stratum (NAS). An RRC layer located at the bottom of a third layer is defined only in the control plane. The RRC layer controls logical channels, transport channels, and physical channels in relation to configuration, re-configuration, and release of radio bearers. A radio bearer refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

DL transport channels for transmission of data from the E-UTRAN to the UE include a broadcast channel (BCH) for transmission of system information, a paging channel (PCH) for transmission of paging messages, and a DL shared channel (SCH) for transmission of user traffic or control messages. Traffic or control messages of a DL multicast or broadcast service may be transmitted through the DL SCH and may also be transmitted through a separate DL multicast channel (MCH). Uplink transport channels for transmission of data from the UE to the network include a random access channel (RACH) for transmission of initial control messages and an UL SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 2 illustrates physical channels and a general signal transmission method using the physical channels in a 3GPP system.

In a wireless communication system, a UE receives information from a BS on DL and transmits information to the BS on UL. Information transmitted and received between the BS and the UE includes data and various types of control information, and there are various physical channels according to the types/usages of the transmitted and received information.

When a UE is powered on or enters a new cell, the UE performs initial cell search including acquisition of synchronization with a BS (S11). For the initial cell search, the UE may receive a PSS, an SSS, and a PBCH in a synchronization signal block (SSB) from the BS. The UE acquires synchronization with the BS and information such as a cell identity (ID) by receiving the PSS and the SSS. Further, the UE may acquire broadcast information within a cell by receiving the PBCH from the BS. Further, the UE may check a DL channel state by receiving a DL RS during the initial cell search.

After the initial cell search, the UE may acquire more detailed system information by receiving a PDCCH and receiving on a PDSCH corresponding to the PDCCH (S12).

Subsequently, to complete the connection to the BS, the UE may perform a random access procedure with the BS (S13 to S16). In the random access procedure, the UE may transmit a preamble on a PRACH (S13) and receive a PDCCH and a random access response (RAR) for the preamble on a PDSCH corresponding to the PDCCH (S14). The UE may then transmit a PUSCH based on scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a PUCCH to the BS (S18), in a general UL/DL signal transmission procedure. Control information that the UE transmits to the BS is generically called UCI. The UCI includes a hybrid automatic repeat and request acknowledgement/negative acknowledgement (HARQ-ACK/NACK), a scheduling request (SR), and channel state information (CSI). The CSI includes a channel quality indicator (CQI), a precoding matrix index (PMI), a rank indicator (RI), and so on. In general, UCI is transmitted on a PUCCH. However, when control information and traffic data should be transmitted simultaneously, the control information and traffic data may be transmitted on a PUSCH. In addition, the UE may transmit the UCI aperiodically on the PUSCH, upon receipt of a request/command from a network.

FIG. 3 is a diagram illustrating exemplary radio frame structures in an LTE system.

Referring to FIG. 3, a radio frame is 10 ms (327200×Ts) long and divided into 10 equal-sized subframes. Each subframe is 1 ms long and further divided into two slots. Each slot is 0.5 ms (15360×Ts) long. Herein, Ts represents a sampling time and Ts=1/(15 kHz×2048)=3.2552×10−8 (about 33 ns). A slot includes a plurality of OFDM symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is purely exemplary and thus the number of subframes in a radio frame, the number of slots in a subframe, or the number of OFDM symbols in a slot may vary.

FIG. 4 is a diagram illustrating a radio frame structure in NR.

In the NR system, UL and DL transmissions are performed in frames. One radio frame is 10 ms in duration, defined by two 5-ms half-frames. One half-frame is defined by five 1-ms subframes. One subframe is divided into one or more slots, and the number of slots in a subframe depends on a subcarrier spacing (SCS). Each slot includes 12 or 14 OFDM(A) symbols according to a cyclic prefix (CP). Each slot includes 14 symbols in a normal CP case, and 12 symbols in an extended CP case. Herein, a symbol may include an OFDM symbol (or a CP-OFDM symbol) and an SC-FDMA symbol (or a discrete Fourier transform-spread-orthogonal frequency division multiplexing (DFT-s-OFDM) symbol).

In the NR system, different OFDM(A) numerologies (e.g., SCSs, CP lengths, and so on) may be configured for a plurality of cells aggregated for a UE. Therefore, the (absolute) duration of a time resource (e.g., a subframe, slot, or TTI) (for the convenience of description, generically referred to as a time unit (TU)) including the same number of symbols may be different between the aggregated cells.

FIG. 5 is a diagram illustrating a slot structure in the NR system. One slot includes a plurality of symbols in the time domain. For example, one slot includes 14 symbols in a normal CP case and 12 symbols in an extended CP case. A carrier includes a plurality of subcarriers in the frequency domain. An RB is defined by a plurality of (e.g., 12) consecutive subcarriers in the frequency domain. A bandwidth part (BWP), which is defined by a plurality of consecutive (P)RBs in the frequency domain, may correspond to one numerology (e.g., SCS, CP length, and so on). A carrier may include up to N (e.g., 5) BWPs. Data communication may be conducted in an activated BWP, and only one BWP may be activated for one UE. In a resource grid, each element is referred to as an RE, to which one complex symbol may be mapped.

FIG. 6 is a diagram illustrating self-contained slot structures in the NR system.

In the NR system, a frame is characterized by a self-contained structure in which all of a DL control channel, DL or UL data, and a UL control channel may be included in one slot. For example, the first N symbols (referred to as a DL control region) of a slot may be used to carry a DL control channel, and the last M symbols (referred to as a UL control region) of the slot may be used to carry a UL control channel Each of N and M is an integer equal to or larger than 0. A resource area (referred to as a data region) between the DL control region and the UL control region may be used for DL data transmission or UL data transmission. A time gap for DL-to-UL or UL-to-DL switching may exist between each control region and the data region. For example, the following configurations may be considered. Each period is arranged in time order.

DL only configuration

UL only configuration

Mixed UL-DL configuration

DL region+GP (guard period)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, an ACK/NACK for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as a GP.

To transmit data in a wide frequency band, while maintaining a high transmission rate for multiple users, the use of an ultra-high frequency band, that is, a millimeter frequency band at or above 6 GHz is considered in the NR system. The technique is called NR in the 3GPP, while it is referred to as an NR system in the present disclosure. However, the millimeter frequency band exhibits the frequency property that a signal is very rapidly attenuated according to a distance due to the use of too high a frequency band. Therefore, the NR system using a band at or above at least 6 GHz adopts a narrow beam transmission scheme in which a signal is transmitted with energy concentrated in a specific direction, not omni-directionally to compensate for rapid propagation attenuation and thus overcome coverage reduction caused by the rapid propagation attenuation. However, because one BS services a narrow range by one narrow beam alone, the BS covers a wideband with multiple narrow beams.

In a millimeter frequency band, that is, a millimeter wave (mmW) band, a wavelength is short, which enables installation of multiple antenna elements over the same area. For example, a total of 100 antenna elements may be installed in a two-dimensional array on a 5*5 cm panel at intervals of 0.5 lambda (wavelength) in a 30 GHz band with a wavelength of about 1 cm. In the mmW system, therefore, to enhance coverage or increase throughput by increasing a beamforming gain using multiple antenna elements is under consideration.

To form a narrow beam in the millimeter frequency band, a beamforming scheme is mainly considered, in which energy is increased only in a specific direction by transmitting the same signal with appropriate phase differences through a large number of antennas at a BS or a UE. Such beamforming schemes include digital beamforming which generates a phase difference in a digital baseband signal, analog beamforming which generates a phase difference in a modulated analog signal based on a time delay (i.e., a cyclic shift), and hybrid beamforming using both digital beamforming and analog beamforming. The use of a transceiver unit (TXRU) per antenna element to enable transmission power control and phase control on an antenna element basis may lead to independent beamforming in each frequency resource. However, installation of TXRUs for all of about 100 antenna elements is not viable in terms of cost effectiveness. That is, because multiple antennas are to be used to compensate for rapid propagation attenuation in the millimeter frequency band, and digital beamforming requires as many radio frequency (RF) components (e.g., digital-to-analog converters (DACs), mixers, power amplifiers, and linear amplifiers) as the number of antennas, implementation of digital beamforming in the millimeter frequency band increases the prices of communication devices. Accordingly, when a large number of antennas are required as is the case with the millimeter frequency band, analog beamforming or hybrid beamforming is considered. In analog beamforming, multiple antenna elements are mapped to one TXRU and the direction of a beam is controlled by an analog phase shifter. Because only one beam direction is generated across a total band in analog beamforming, frequency selective beamforming is not possible. Hybrid beamforming is an intermediate scheme between digital beamforming and analog beamforming, in which there are B TXRUs fewer than Q antenna elements. Although there are differences depending on how the B TXRUs are connected to the Q antenna elements, the number of the directions of beams which may be simultaneously transmitted is limited to B or less in hybrid beamforming.

As described before, because a transmission or received digital baseband signal is subjected to signal processing in digital beamforming, the signal may be transmitted or received simultaneously in multiple directions by multiple beams. Compared to digital beamforming, a transmission or received analog signal is subjected to beamforming in a modulated state in analog beamforming. Therefore, the signal may not be transmitted or received simultaneously in multiple directions outside a range covered by one beam. In general, a BS communicates with multiple users at the same time through wideband transmission or based on a multi-antenna property. When the BS forms an analog beam in one beam direction in analog beamforming or hybrid beamforming, the BS communicates only with users within the same analog beam direction in view of the nature of analog beamforming. A method of allocating RACH resources and using BS resources according to the present disclosure is proposed in consideration of limitations inherent to analog beamforming or hybrid beamforming.

FIG. 7 is a diagram illustrating a hybrid beamforming structure from the perspective of TXRUs and physical antennas.

Along with the use of multiple antennas, a hybrid beamforming scheme with digital beamforming and analog beamforming combined has been introduced. Analog beamforming (or RF beamforming) is an operation of performing precoding (or combining) at a transceiver (or RF unit). In hybrid beamforming, each of a baseband unit and a transceiver (or RF unit) performs precoding (or combining), thereby achieving performance approaching that of digital beamforming, with reduced numbers of RF chains and DACs (or analog-to-digital converters (ADCs)). For the convenience's sake, a hybrid beamforming structure may be represented by N TXRUs and M physical antennas. Digital beamforming for L data layers to be transmitted from a transmitter may be represented as an N-by-L matrix. Then, N digital signals are converted to analog signals through the TXRUs and subjected to analog beamforming represented as an M-by-N matrix.

In FIG. 7, the number of digital beams is L and the number of analog beams is N. The NR system seeks to support more efficient beamforming to a UE located in a specific area by designing a BS to change analog beamforming on a symbol basis. With one antenna panel defined by N TXRUs and M RF antennas, the introduction of a plurality of antenna panels to which independent hybrid beamforming is applicable is further under consideration in the NR system. As such, when the BS uses a plurality of analog beams, each UE may have a different analog beam suitable for signal reception. Accordingly, a beam sweeping operation is under consideration, in which a BS changes a plurality of analog beams to be applied on a symbol basis in a specific slot or subframe, for at least a synchronization signal, system information, paging, and so on, so that all UEs may have reception opportunities.

FIG. 8 is a schematic diagram illustrating a beam sweeping operation for a synchronization signal and system information in a DL transmission procedure A physical resource (or physical channel) carrying system information in the NR system to which the present disclosure is applicable is referred to as an xPBCH. Analog beams from different antenna panels may be simultaneously transmitted in one symbol. As illustrated in FIG. 8, the introduction of a beam RS (BRS), an RS transmitted for a single analog beam corresponding to a specific antenna panel is under discussion to measure a channel for each analog beam. The BRS may be defined for a plurality of antenna ports, and each antenna port of the BRS may correspond to a single analog beam. Unlike the BRS, a synchronization signal or the xPBCH may be transmitted for all analog beams in an analog beam group, such that any UE may receive the signal successfully.

FIG. 9 illustrates an exemplary cell in the NR system.

Referring to FIG. 9, compared to a wireless communication system such as the legacy LTE system in which one BS covers one cell, configuring one cell with a plurality of transmission and reception points (TRPs) is under discussion in the NR system. When a plurality of TRPs cover one cell, seamless communication is possible and mobility management is facilitated for a UE, even though a TRP serving the UE is changed.

Compared to the LTE/LTE-A system in which the PSS/SSS is transmitted omni-directionally, a method of transmitting a signal such as a PSS/SSS/PBCH by beamforming, while sweeping beams in all beam directions at a gNB using mmWave is under consideration. This transmission/reception of a signal by sweeping beams in beam directions is referred to as beam sweeping or beam scanning In the present disclosure, "beam sweeping" is a transmitter behavior, and "beam scanning" is a receiver behavior. For example, given up to N beam directions, the gNB transmits a signal such as a PSS/SSS/PBCH in each of the N beam directions. That is, the gNB transmits a synchronization signal such as the PSS/SSS/PBCH in each direction, while sweeping a beam in directions available to or supported by the gNB. Alternatively, when the gNB is capable of forming N beams, the gNB may group the beams into beam groups each including a few beams, and transmit/receive the PSS/SSS/PBCH on a beam group basis. One beam group includes one or more beams. The PSS/SSS/PBCH transmitted in the same direction may be defined as one SSB, and there may exist a plurality of SSBs within one cell. In the presence of a plurality of SSBs, SSB indexes may be used to distinguish the SSBs from each other. For example, when the PSS/SSS/PBCH is transmitted in 10 beam directions in a system, it may be understood that the PSS/SSS/PBCH transmitted in the same direction forms one SSB, and 10 SSBs exist in the system. In the present disclosure, a beam index may be interpreted as an SSB index.

An SSB also called an SS/PBCH block is transmitted periodically according to an SSB periodicity.

The UE may perform, based on the SSB, DL synchronization acquisition (e.g., detection of an OFDM symbol/slot/half-frame boundary), cell identifier (ID) (e.g., physical cell identifier (PCID)) acquisition, beam alignment for initial access, master information block (MIB) acquisition, and DL measurement.

For 3GPP Rel. 16, that is, the standardization of the NR system, a relay gNB is under discussion to reduce wired connections between gNBs, while averting coverage holes. This approach is called integrated access and backhaul (IAB), in which a donor gNB (DgNB) transmits a signal to a UE through a relay gNB (relay node). The IAB includes a wireless backhaul link for communication between a DgNB and a relay gNB or between relay gNBs and an access link for communication between the DgNB and a UE or between the relay gNB and the UE.

In simultaneous transmissions and reception in frequency division multiplexing (FDM)/spatial division multiplexing (SDM) on a backhaul link and an access link in which simultaneous transmission and reception or simultaneous transmissions and receptions in FDM/SDM on backhaul links in an IAB environment, power control is required for transmissions to or receptions from both nodes in view of interference between signals transmitted to or received from both sides. The present disclosure relates to transmission and reception power control for signal transmissions and receptions to and from both nodes in an IAB environment. Hereinbelow, a relay node and an IAB node may be used in the same concept.

Since the current IAB scenario considers multiple hops, one IAB node has a backhaul link with a parent node (e.g., a parent IAB node or a DgNB), a backhaul link with a child node (e.g., a child IAB node), and an access link with a UE. Herein, a backhaul link with a parent node is defined as a P-BH, a backhaul link with a child node is defined as a C-BH, and an access link with a UE is defined as an AC. In the IAB scenario, multiplexing schemes including time division multiplexing (TDM), SDM, and FDM are all considered for the P-BH, the C-BH, and the AC. When FDM/SDM is basically considered, simultaneous transmissions and receptions need to occur on three or more links. To this end, synchronization timings or transmission timing boundaries should be aligned between nodes or between a node and a UE. Depending on a node to which a signal transmission is directed, a synchronization timing or a transmission timing should be continuously changed at each transmission.

As FDM or SDM has high resource efficiency, intermittent operation of FDM or SDM only for some transmissions by changing a transmission timing may be a way to contribute to improvement of overall performance and alleviate the problem of a continuously changing timing. Although a scenario in which FDM/SDM is mainly applied between the P-BH and the C-BH or between the P-BH and the AC is considered in the present disclosure, the present disclosure is also applicable to FDM/SDM among the P-BH, the C-BH, and the AC.

The current IAB scenarios include an in-band scenario in which the BH and the AC are operated in the same band, and an out-band scenario in which the BH and the AC are operated in different bands. Since the effect of interference is dominant on FDM in the same band on the frequency axis, the main scenario of the present disclosure is the in-band scenario. However, when harmonics or harmonic mixing interference is problematic in the out-band scenario, the present disclosure is also applicable.

The scenario of FDM/SDM between the P-BH and the C-BH or between the P-BH and the AC may be considered separately in four cases as illustrated in FIG. 10.

FIG. 10(a) illustrates simultaneous transmissions to a parent IAB node and a UE from an IAB node (Case 1-1), and FIG. 10(b) illustrates simultaneous transmissions to a parent IAB node and a child IAB node from an IAB node (Case 1-2). That is, a UL transmission from a relay node to a parent node (e.g., a parent IAB node or a gNB) and a DL transmission from the relay node to a child node (e.g., a child IAB node or a UE) are performed in Case 1-1 and Case 1-2. FIG. 10(c) illustrates simultaneous receptions at an IAB node from a parent IAB node and a UE (Case 2-1), and FIG. 10(d) illustrates simultaneous receptions at an IAB node from a parent IAB node and a child IAB node (Case 2-2). That is, a DL reception at a relay node from a parent node and a UL reception at the relay node from a child node are performed in Case 2-1 and Case 2-2.

FDM or SDM may be considered for all of the four cases. For description, a parent IAB node will be referred to as a P-IAB, and a child IAB node will be referred to as a C-IAB.

In Case 1-1, the IAB node is a DL entity that transmits a signal to the UE on the access link. The power of the DL signal may be suddenly dropped. Particularly, when the power of a signal used for synchronization or measurement such as an SSB or a measurement RS among DL signals is decreased, synchronization coverage is suddenly reduced or a channel measurement result is affected.

In Case 1-1, when the IAB node transmits with low power according to UL power control of the P-IAB, a power imbalance of 6 dB or higher should not occur in the case of FDM during FDM mapping of adjacent RBs in order to reduce the effect of in-band emission. When the IAB node transmits a UL signal to the P-IAB with low power according to the UL power control of the P-IAB, the IAB node may also have to lower the power of an FDMed AC DL signal. In the case of SDM, the BH UL directed to the P-IAB and the AC DL directed to the UE directly interfere with each other. Therefore, when BH UL power is set to be low, AC DL power may have to be inevitably lowered as well.

In another aspect, when the IAB node transmits with high power according to UL power control of the P-IAB, the IAB node may share a power amplifier (PA) between the BH and the AC in FDM or SDM. In this case, since high power should be set for the BH UL, when the remaining power is small, the IAB node may have to allocate the small amount of power to the AC DL inevitably.

To solve the problem encountered in Case 1-1, the P-IAB may control the power of the AC DL directed from the IAB node to the UE. In this method, the P-IAB limits the power of the AC DL and uses the power restriction in UL power control for its C-IAB (e.g., the BH UL between the P-IAB and the IAB node, which is a child node of the P-IAB). The AC DL power control of the P-IAB has two implications: the P-IAB's determination of the coverage of its own C-IAB to some extent; and prediction and use of interference between links in FDM or SDM, when the P-IAB controls the power of the BH-UL directed to the P-IAB based on this power.

Embodiment 1. The P-IAB indicates a maximum transmission AC DL power value (or BH DL power value) X to its child, the IAB node.

A. The P-IAB may indicate the value X to the child IAB node by a higher-layer signal (e.g., RRC signal).

B. Because the value X is a maximum DL power value for the IAB node, Pcmax−X may substitute for Pcmax and may be applied to every UL power control.

i. The following power control equation is applied to, for example, a PUSCH.

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

In the above equation, Pcmax−X may substitute for Pcmax.

ii. For a DL signal or resource other than a specific DL signal or a specific resource, when the P-BH UL and the AC DL are multiplexed in FDM or SDM, Pcmax may be split between the P-BH UL and the AC DL. In this case, DL power Y may first be determined and then power may be used for the BH UL based on the remaining power. For the PUSCH, for example, Pcmax may be replaced with Pcmax−Y in the following equation.

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

This means that after the DL power Y is determined, the remaining power is used for the BH UL (eventually against the UL power control of the P-IAB). The P-IAB may set the value Y as well as the value X by the RRC. This is done to predict DL power for each resource and thus overcome a UL signal, which is difficult to overcome through BH UL power control, by repetition or a low MCS.

C. In the current intra-band CA, there is a requirement that the UE should multiplex adjacent bands in FDM in each carrier, without a difference of 6 dB or higher between adjacent RBs. The requirement is intended to reduce interference caused by in-band emission in the frequency domain. When the IAB node multiplexes the BH UL and the AC DL in FDM, there may still be the effect of in-band emission. Even though the AC DL power is limited to the power X, the power spectral density (PSD) of the AC DL calculated by the power X may be different from the PSD of the BH UL subjected to the UL power control of the P-IAB by 6 dB or higher. Without knowledge of how much the AC DL has been allocated to which RB, the P-IAB controls the BH UL power independently of the AC DL power, and thus the IAB node should inevitably reduce the AC DL power. In Embodiment 1, therefore, the P-IAB needs to make an assumption as to an RB to which power is allocated. Because the P-IAB does have knowledge of a DL resource allocation and DL power of its child IAB node, the P-IAB assumes that total power is the configured power X (for relaxation, +delta or −delta may be applied to X, a delta value and its sign + or − may be predefined for each band or band combination, defined as a ratio to the size of a system bandwidth (or active bandwidth part), or configured by the RRC), and the power X is split for A RBs assumed to be an AC DL transmission. The value A may be predefined for each band or each combination of bands, may be defined as a ratio to the size of the system bandwidth (or active bandwidth part), or may be configured by the RRC. In other words, the P-IAB may perform UL power control for the child IAB node, assuming that when the IAB node allocates the AC DL to A RBs with power X+delta (or X−delta), the BH UL is allocated to an RB adjacent to the AC DL transmission.

This implies that when the child IAB node multiplexes the BH UL and the AC DL in FDM, the P-IAB substantially controls the BH UL power to minimize interference between the two links. When the child IAB node allocates the BH UL and the AC DL to adjacent RBs despite the BH UL power control and the PSD difference between the BH UL and the AC DL is a specific power value P or larger (the value P may be predefined for each band or each band combination, defined according to the system bandwidth (or active bandwidth part), or configured by the RRC), the child IAB node may operate as follows.

i. It may be regulated that the BH UL power is controlled such that the PSD difference between the BH UL and the AC DL is not P or larger (to ensure the coverage of DL signals).

ii. It may be regulated that the AC DL power is controlled such that the PSD difference between the BH UL and the AC DL is not P or larger (to reduce the power imbalance of UL signals from the perspective of the P-IAB node as a receiver).

iii. To prevent the power difference between the BH UL and the AC DL from being P or larger, a link to be subject to power control may be configured by the RRC. Alternatively, the link to be subject to power control may be configured differently by the RRC according to a specific DL signal (e.g., an SSB, RMSI, an RMSI CORESET, a measurement RS, and so on, one of which may be configured by the RRC) or a specific DL resource (the specific DL resource may be configured for the child IAB node through the RRC by the P-IAB node or may be predefined. The DL resource may be in units of a slot, and the power transient and phase discontinuity problem may be considered).

D. Compared to the description in C, when the BH UL and the AC DL are multiplexed in SDM, the P-IAB may control the BH UL power, assuming that the BH UL and the AC DL are always identical in a transmission start and end and an allocated frequency range, and the power X (for relaxation +delta or −delta may be applied to X, and a delta value and its sign + or − may be predefined for each band or band combination or may be defined according to the system bandwidth (or active bandwidth part)) is used for the AC DL.

This implies that when the child IAB node multiplexes the BH UL and the AC DL in FDM, the P-IAB substantially controls the BH UL power to minimize interference between the two links. When the child IAB node allocates the BH UL and the AC DL to adjacent RBs despite the BH UL power control and the PSD difference between the BH UL and the AC DL is a specific power value P or larger (the value P may be predefined for each band or each band combination, defined according to the system bandwidth (or active bandwidth part), or configured by the RRC), the child IAB node may operate as follows.

i. It may be regulated that the BH UL power is controlled such that the PSD difference between the BH UL and the AC DL is not P or larger (to ensure the coverage of DL signals).

ii. It may be regulated that the AC DL power is controlled to prevent the PSD difference between the BH UL and the AC DL from being a power value P or larger (to reduce power imbalance between UL signals from the perspective of the P-IAB node as a receiver).

iii. To prevent the power difference between the BH UL and the AC DL from being P or larger, a link to be subject to power control may be configured by the RRC. Alternatively, the link to be subject to power control may be configured differently by the RRC according to a specific DL signal (e.g., an SSB, RMSI, an RMSI CORESET, a measurement RS, and so on, one of which may be configured by the RRC) or a specific DL resource (the specific DL resource may be configured for the child IAB node through the RRC by the P-IAB node or may be predefined. The DL resource may be in units of a slot, and the power transient and phase discontinuity problem may be considered).

E. The invention of embodiment 1 basically sets the maximum power of an AC DL signal.

i. In FDM, the BH UL and the AC DL on which the IAB node simultaneously transmits signals need to be identical in transmission starting and ending times. When the transmission starting and ending times are different between the BH UL and the AC DL, the power of the PA varies with time, resulting in phase discontinuity and hence a decoding problem (hopping boundaries should also be the same). Therefore, when the BH UL and the AC DL multiplexed in FDM are different in their transmission starting and ending times or their hopping boundaries, the IAB node may operate to drop the BH UL transmission (in addition to the above drop condition, the BH UL transmission may be dropped when the BH UL and AC DL are actually spaced by K or fewer RBs, where the value of K may be predefined or configured by the RRC).

The drop may be applied only for a specific DL signal (e.g., an SSB, RMSI, an RMSI CORESET, a measurement RS, and so on, one of which may be configured by the RRC) or a specific DL resource (the specific DL resource may be configured for the child IAB node through the RRC by the P-IAB node or may be predefined. The DL resource may be in units of a slot, and the power transient and phase discontinuity problem may be considered). For a DL signal or DL resource other than the defined DL signal or DL resource, the IAB node may drop the DL signal, not the UL signal.

Whether to apply the drop may be determined in consideration of a UE capability (or IAB capability). It may be defined that the drop is not applied to a UE (or IAB node) capable of overcoming phase discontinuity, when the BH UL and the AC DL are different in their transmission starting and ending times or their hopping boundaries.

ii. In SDM, the BH UL and the AC DL on which simultaneous transmissions take place need to be identical in their transmission starting and ending times. When the transmission starting and ending times are different between the BH UL and the AC DL, the power of the PA varies with time, resulting in phase discontinuity and hence a decoding problem (hopping boundaries should also be the same). Further, the BH UL and the AC DL need to be identical in their frequency starting and ending points. When the BH UL and the AC DL differ in the frequency starting and ending points, the interference level may be different between an SDMed frequency and the other transmitted parts, thus degrading channel estimation and performance. Therefore, when the BH UL and the AC DL multiplexed in SDM are different in their transmission starting and ending times, their hopping boundaries, or their frequency starting and ending points, the IAB node may operate to drop the BH UL transmission.

The drop may be applied only for a specific DL signal (e.g., an SSB, RMSI, an RMSI CORESET, a measurement RS, and so on, one of which may be configured by the RRC) or a specific DL resource (the specific DL resource may be configured for the child IAB node through the RRC from the P-IAB node or may be predefined. The DL resource may be in units of a slot, and the power transient and phase discontinuity problem may be considered). For a DL signal or DL resource other than the defined DL signal or DL resource, the IAB node may drop the DL signal instead of the UL signal.

Whether to apply the drop may be determined in consideration of a UE capability (or IAB capability). It may be defined that the drop is not applied to a UE (or IAB node) capable of overcoming phase discontinuity or interference, when the BH UL and the AC DL are different in their transmission starting and ending times, their hopping boundaries, or their transmission frequency starting and ending points.

A shortcoming with the invention of Embodiment 1 lies in that DL power should be always limited during a specific semi-static time. To overcome the shortcoming, the DL power may be set to X in a specific DL signal or resource (in units of a slot, and the power transient and phase discontinuity problem may be considered).

Embodiment 2. The P-IAB may indicate a maximum transmission AC DL power value (or BH DL power value) X to its child IAB node, simultaneously indicating that the power value X is applied only to a specific DL signal or resource (in units of a slot, and the power transient and phase discontinuity problem may be considered).

A. The P-IAB may indicate the value X by a higher-layer signal (e.g., RRC signal). The value X may be set differently for each specific signal or each specific resource. This is because the amount of power to be controlled may be different for each specific resource.

B. The specific signal (e.g., SSB, RMSI, RMSI CORESET, measurement RS, or the like) may be predefined or specified by the RRC.

C. The specific resource may be predefined or specified by the RRC.

D. The value X is the maximum DL power value used for the specific signal or resource from the perspective of the IAB node. Accordingly, Pcmax−x may substitute for Pcmax to be applied to every UL power control.

i. The following power control equation is currently applied, for example, to a PUSCH.

$$P_{PUSCH,b,f,c}(i, j, q_d, l) = \min\left\{\begin{array}{l} P_{CMAX,j,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\}$$

In the above equation, Pcmax−x may substitute for Pcmax.

ii. For a DL signal or resource other than the specific DL signal or resource, when the P-BH UL and the AC DL are multiplexed in FDM or SDM, Pcmax may be split between the P-BH UL and the AC DL.

In this case, DL power Y may first be determined and then power may be used for the BH UL based on the remaining power. In the case of the PUSCH, for example, Pcmax−Y may substitute for Pcmax in the following equation.

$$P_{PUSCH,b,f,c}(i, j, q_d, l) = \min\left\{\begin{array}{l} P_{CMAX,j,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\}$$

This implies that after the DL power Y is determined, the remaining power is used for the BH UL (eventually against UL power control of the P-IAB). The P-IAB may configure the value Y as well as the value X by the RRC. This is done to predict DL power for each resource and overcome a UL signal difficult to overcome through BH UL power control by repetition or a low MCS.

E. For intra-band CA, there is a requirement that the UE should multiplex adjacent bands in FDM in each carrier, without a difference of 6 dB or higher between adjacent RBs. The requirement is intended to reduce interference caused by in-band emission in the frequency domain. When the IAB node multiplexes the BH UL and the AC DL in FDM, there may still be the effect of in-band emission. Even though the AC DL power is limited to the power X, the power spectral density (PSD) of the AC DL calculated by the power X may be different from the PSD of the BH UL subjected to the UL power control of the P-IAB by 6 dB or higher. Without knowledge of how much the AC DL has been allocated to which RB, the P-IAB controls the BH UL power independently of the AC DL power, and thus the IAB node should inevitably reduce the AC DL power. In Embodiment e, therefore, the P-IAB needs to make an assumption as to an RB to which power is allocated. Because the P-IAB does have knowledge of a DL resource allocation and DL power of its child IAB node, the P-IAB assumes that total power is the configured power X (for relaxation, +delta or −delta may be applied to X, a delta value and its sign + or − may be predefined for each band or band combination, defined as a ratio to the size of a system bandwidth (or active bandwidth part), or configured by the RRC), and the power X is split for A RBs assumed to be an AC DL transmission. The value A may be predefined for each band or each combination of bands, may be defined as a ratio to the size of the system bandwidth (or active bandwidth part), or may be configured by the RRC. In other words, the P-IAB may perform UL power control for the child IAB node, assuming that when the IAB node allocates the AC DL to A RBs with power X+delta (or X−delta), the BH UL is allocated to an RB adjacent to the AC DL transmission.

This implies that when the child IAB node multiplexes the BH UL and the AC DL in FDM, the P-IAB substantially controls the BH UL power to minimize interference between the two links. When the child IAB node allocates the BH UL and the AC DL to adjacent RBs despite the BH UL power control and the PSD difference between the BH UL and the AC DL is a specific power value P or larger (the value P may be predefined for each band or each band combination, defined according to the system bandwidth (or active bandwidth part), or configured by the RRC), the child IAB node may operate as follows.

i. It may be regulated that the power of the BH UL is controlled such that the PSD difference between the BH UL and the AC DL is not P or larger (to ensure the coverage of DL signals).

ii. It may be regulated that the power of the AC DL is controlled such that the PSD difference between the BH UL and the AC DL is not P or larger (to reduce the power imbalance of UL signals from the perspective of the P-IAB node as a receiver).

iii. To prevent the power difference between the BH UL and the AC DL from being P or larger, a link to be subject to power control may be configured by the RRC. Alternatively, the link to be subject to power control may be configured differently by the RRC according to a specific DL signal (an SSB, RMSI, an RMSI CORESET, a measurement RS, and so on, one of which may be configured by the RRC) or a specific DL resource (the specific DL resource may be configured for the C-IAB node through the RRC by the P-IAB node or may be predefined. The DL resource may be in units of a slot, and the power transient and phase discontinuity problem may be considered).

F. Compared to the description in E, when the BH UL and the AC DL are multiplexed in SDM, the P-IAB may control the power of the BH UL, assuming that the BH UL and the AC DL are identical in the transmission start and end and an allocated frequency range, and the power X (for relaxation +delta or −delta may be applied to X, and a delta value and its sign + or − may be predefined for each band or band combination or may be defined according to the system bandwidth (or active bandwidth part)) may be used for the AC DL.

This implies that when the child IAB node multiplexes the BH UL and the AC DL in SDM, the P-IAB substantially controls the BH UL power to minimize interference between the two links. When the child IAB node multiplexes the BH UL and the AC DL in SDM despite the BH UL power control, and the PSD difference between the BH UL and the AC DL is a specific power value P or larger (the value P may be predefined for each band or each band combination, defined according to the system bandwidth (or active bandwidth part), or configured by the RRC), the child IAB node may operate as follows.

i. It may be regulated that the power of the BH UL is controlled such that the PSD difference between the BH UL and the AC DL is not P or larger (to ensure the coverage of DL signals).

ii. It may be regulated that the power of the AC DL is controlled such that the PSD difference between the BH UL and the AC DL is not P or larger (to reduce the power imbalance of UL signals from the perspective of the P-IAB node as a receiver).

iii. To prevent the power difference between the BH UL and the AC DL from being P or larger, a link to be subject to power control may be configured by the RRC. Alternatively, the link to be subject to power control may be configured differently by the RRC according to a specific DL signal (e.g., an SSB, RMSI, an RMSI CORESET, a measurement RS, and so on, one of which may be configured by the RRC) or a specific DL resource (the specific DL resource may be configured for the child IAB node through the RRC by the P-IAB node or may be predefined. The DL resource may be in units of a slot, and the power transient and phase discontinuity problem may be considered).

G. The invention of Embodiment 2 basically sets maximum power available for a specific DL signal or a specific resource.

i. In FDM, the BH UL and the AC DL on which the IAB node simultaneously transmits signals need to be identical in their transmission starting and ending times. When the transmission starting and ending times are different between the BH UL and the AC DL, the power of the PA varies with time, resulting in phase discontinuity and hence a decoding problem (hopping boundaries should also be the same). Therefore, when the BH UL and the AC DL multiplexed in FDM are different in their transmission starting and ending times or their hopping boundaries, the IAB node may operate to drop the BH UL transmission (in addition to the above drop condition, the BH UL transmission may be dropped when the BH UL and AC DL are actually spaced by K or fewer RBs, where the value of K may be predefined or configured by the RRC).

The drop may be applied only for the specific DL signal or resource described in Embodiment 1. For a DL signal or DL resource other than the defined DL signal or DL resource, the IAB node may drop the DL signal, not the UL signal.

Whether to apply the drop may be determined in consideration of a UE capability (or IAB capability). It may be defined that the drop is not applied to a UE (or IAB node) capable of overcoming phase discontinuity, when the BH UL and the AC DL are different in their transmission starting and ending times or their hopping boundaries.

ii. In SDM, the BH UL and the AC DL on which simultaneous transmissions take place need to be identical in their transmission starting and ending times. When the transmission starting and ending times are different between the BH UL and the AC DL, the power of the PA varies with time, resulting in phase discontinuity and hence a decoding problem (hopping boundaries should also be the same). Further, the BH UL and the AC DL need to be identical in their frequency starting and ending points. If the frequency values are different from each other, the interference level may be different between the SDMed frequency and the other transmitted parts, thus degrading channel estimation and performance. Therefore, when the BH UL and the AC DL multiplexed in SDM are different in their transmission starting and ending times, their hopping boundaries, or their frequency starting and ending points, the IAB node may operate to drop the BH UL transmission.

The drop may be applied only for the afore-described specific DL signal or resource. For a DL signal or DL resource other than the defined DL signal or DL resource, the IAB node may drop the DL signal, not the UL signal.

Whether to apply the drop may be determined in consideration of a UE capability (or IAB capability). It may be defined that the drop is not applied to a UE (or IAB node) capable of overcoming phase discontinuity, when the BH UL and the AC DL are different in their transmission starting and ending times, their hopping boundaries, or their frequency starting and ending points.

In Case 1-2, the BH DL power may not be guaranteed. To overcome this problem, the following method is proposed.

Embodiment 3. For a DL signal or resource other than a specific DL signal or a specific resource, when the P-BH UL and the AC DL are multiplexed in FDM or SDM, Pcmax may be split between the P-BH UL and the BH DL.

A. In this case, DL power Y may first be determined and then power may be used for the BH UL based on the remaining power. For example, in the case of a PUSCH, Pcmax may be replaced with Pcmax−Y in the following equation.

The problem and solution of Case 1-2 are similar to those of Case 1-1. The above description is applicable in the same manner by replacing AC DL with BH DL and replacing UE with C-IAB.

In Case 2-1, when the BH DL and the AC UL are multiplexed in FDM or SDM, the power of one of the links may increase. Particularly, the power of the BH DL may be greater than that of the AC UL because the P-IAB transmits a signal on the BH DL. When the reception power of the BH DL becomes higher than the reception power of the AC UL, the BH DL acts as great interference with the AC UL, thus making decoding difficult.

In order to solve the above-described problem of Case 2-1, the IAB node should control the power of the UE according to the BH DL reception from the P-IAB. Because the maximum power of the UE is basically lower than that of the P-IAB, it may be difficult to reduce interference in spite of power control. Therefore, a method of requesting the parent, P-IAB to adjust the DL power of the P-BH by the child, IAB node may be considered.

Embodiment 4. The P-IAB may indicate to the child IAB node that a signal will be transmitted on the BH DL with power X by performing DL power control only for a signal other than a specific signal such as an SSB, RMSI, an RMSI CORESET, a measurement RS, or the like, or only for a designated resource area (the resource area may be in units of a slot and the power transient and phase discontinuity problem may be considered).

A. The P-IAB may indicate the power X directly to the child IAB node by the RRC, or the power X may be predefined.

B. The P-IAB may not indicate the power X directly to the child IAB node. Instead, the P-IAB may indicate the power X indirectly to the child IAB node by transmitting a specific RS with lowered power. The P-IAB may also configure the specific RS and transmit the RS with the power X, indicating to the child IAB node that the P-IAB will transmit a signal on the BH DL with the corresponding power.

C. The child IAB node may request the P-IAB to implement the afore-described inventions.

i. In a semi-statically operating system, the IAB node may request the P-IAB to transmit a signal on the BH DL with power X by a scheduling request (SR) sequence. In the presence of a plurality of X values, the P-IAB may configure a set of X values, each being mapped to an SR sequence, and the child IAB node may request the BH DL transmission with the power X by an SR sequence mapped to the value X.

$$P_{PUSCH,b,f,c}(i, j, q_d, l) = \min\left\{\begin{array}{l} P_{CMAX,j,c}(i), \\ P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\}$$

This means that after the DL power Y is determined, the remaining power is used for the BH UL (eventually against UL power control of the P-IAB). The P-IAB may set the value Y as well as the value X by the RRC. This is done to predict DL power for each resource and thus overcome a UL signal, which is difficult to overcome through BH UL power control, by repetition or a low MCS.

B. The invention of Embodiment 3 may be applied only for a specific DL signal (e.g., an SSB, RMSI, an RMSI CORESET, a measurement RS, and so on, one of which may be configured by the RRC) or a specific DL resource (in units of a slot. The power transient and phase discontinuity problem may be considered).

ii. In a semi-statically operating system, after transmitting an SR, the IAB node may request the P-IAB to transmit a signal on the BH DL with power X, through a PUCCH or PUSCH transmission. In the presence of a plurality of X values, the P-IAB may configure a set of X values, each being mapped to a PUCCH or PUSCH transmission signal or message, and the child IAB node may request the BH DL transmission with the power X by a PUCCH or PUSCH transmission signal or message mapped to the value X.

iii. In a semi-statically operating system, the IAB node may request the P-IAB to transmit a signal on the BH DL with power X, through a PUSCH transmission in a grant free resource. In the presence of a plurality of X values, the P-IAB may configure a set of X values, each being mapped to a PUSCH or message transmitted in a grant free resource, and the child IAB node may request the BH DL transmission with the power X by a PUSCH or message transmitted in a grant free resource, mapped to the value X.

The invention of Embodiment 4 may be implemented dynamically as follows.

Embodiment 5. The P-IAB may indicate to the child IAB node that a signal will be transmitted on the BH DL in a power range Y by performing DL power control only for a signal other than a specific signal such as an SSB, RMSI, an RMSI CORESET, a measurement RS, or the like, or only for a designated resource area (the resource area may be in units of a slot, and the power transient and phase discontinuity problem may be considered). Y represents a power range available for the BH DL transmission, defined by a lowest bound and a highest bound.

A. It may be assumed that the P-IAB may indicate the difference between power levels within the range Y by the RRC (each power value within the range Y is referred to as a Z value), and basically, a Z value within the range Y requested by the child IAB node is additionally applied to the current BH DL power. The Z value may be applied in addition to a previous Z value (accumulation scheme) or may be applied alone (absolute scheme).

B. The child IAB node may request the P-IAB to implement the invention of Embodiment 4.

i. In a dynamically operating system, this may be requested by an SR sequence. In the presence of a plurality of Z values, the P-IAB may configure a set of Z values, each being mapped to an SR sequence, and the child IAB node may make the request by an SR sequence mapped to an intended Z value.

ii. In a dynamically operating system, the request may be made by transmitting a PUSCH in a grant free resource. In the presence of a plurality of Z values, the P-IAB may configure a set of Z values, each being mapped to a PUSCH or message transmitted in a grant free resource, and the child IAB node may make the request by a PUSCH or message transmitted in a grant free resource, mapped to an intended Z value.

iii. After the child IAB node transmits the request by an SR or a grant free source, a timing at which the gNB applies the Z value may be pre-indicated to the child IAB node through the RRC by the P-IAB or may be predefined. Alternatively, when transmitting the request by the SR or the grant free resource, the child IAB node may also request an application timing to the P-IAB. Candidate values for the application timing may be pre-indicated to the child IAB node through the RRC by the P-IAB node.

A method of transmitting and receiving a signal according to an embodiment of the present disclosure will be described with reference to FIGS. 11 and 12.

FIG. 11 illustrates a relay node-based simultaneous transmission case in which a relay node transmits a UL (first UL) signal to a parent node, and a DL (first DL) signal to a child node. The parent node may be a parent IAB node or a donor gNB, and the child node may be a child IAB node or a UE. The first UL between the relay node and the parent node is a backhaul link. When the child node is an IAB node, the first DL between the relay node and the child node is a backhaul link, whereas when the child node is a UE, the first DL between the relay node and the child node is an access link. The first DL signal and the first UL signal may be multiplexed, for example, in FDM or SDM. These multiplexing methods are merely exemplary and other multiplexing methods are also available.

First, the relay node may receive transmission power information about the first DL signal from the parent node (S1110). The transmission power information about the first DL signal may include a maximum transmission power value X for the first DL signal. The first DL signal to which the maximum transmission power value is applied may be limited to a specific DL signal. For example, the power X may be applied to a DL signal for synchronization such as an SSB or a DL signal for channel measurement such as a CSI-RS.

When the first DL signal and the first UL signal are multiplexed, the relay node may operate to control the transmission power of one of the first DL signal and the first UL signal such that the transmission power difference between the first DL signal and the first UL signal is not equal to or larger than a specific threshold. The specific threshold may be predefined in the system or configured by a higher-layer signal. Whether the relay node will control the transmission power of the first DL signal or the first UL signal may be configured by a higher-layer signal.

The relay node may transmit the first DL signal to the child node based on the transmission power information about the first DL signal (S1130). Further, the relay node may transmit the first UL signal to the parent node based on the transmission power information about the first DL signal (S1120). The transmission power of the first UL signal may be determined based on the maximum transmission power value X of the first DL signal (refer to the afore-described equation).

FIG. 12 illustrates a relay node-based simultaneous reception case in which a relay node receives a DL (second DL) signal from a parent node, and a UL (second UL) signal from a child node. The second DL between the relay node and the parent node is a backhaul link. When the child node is an IAB node, the second UL between the relay node and the child node is a backhaul link, whereas when the child node is a UE, the second UL between the relay node and the child node is an access link. The second DL signal and the second UL signal may be multiplexed, for example, in FDM or SDM. These multiplexing methods are merely exemplary and other multiplexing methods are also available.

First, the relay node may receive transmission power information about the second DL signal from the parent node (S1210). The transmission power information about the second DL signal may include a transmission power value X for the second DL signal or a transmission power value range Y for the second DL signal. The transmission power value X or the transmission power value range Y may be applied only to the second DL signal except for a specific DL signal. For example, the power X or the range Y may not be applied to a DL signal for synchronization such as an SSB or a DL signal for channel measurement such as a CSI-RS, whereas the power X or the range Y may be applied to the remaining DL signals except for the specific signal.

While the parent node has been described as providing the transmission power information about the second DL signal to the relay node in S1210, the relay node may request the transmission power information about the second DL signal to the parent node. For example, the relay node may request the parent node to transmit the second DL signal with a specific transmission power value X.

The relay node may receive the second DL signal based on the transmission power information about the second DL signal (S1220). The relay node may also receive the second UL signal from the child node (S1120).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 15 illustrates another example of a wireless device applied to the present disclosure. The wireless device may be implemented in various forms according to a use case/service (refer to FIG. 13).

Referring to FIG. 15, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcasting terminal, a hologram device, a public safety device, an MTC device, a medical device, a FinTech device (or a finance device), a security device, a climate/environment device, the AI server/device (400 of FIG. 13), the BSs (200 of FIG. 13), a network node, or the like. The wireless device may be mobile or fixed according to a use case/service.

In FIG. 15, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, a relay, or other equipment in a wireless mobile communication system.

The invention claimed is:

1. A communication method of a relay node in a wireless communication system, comprising:
   receiving, from a parent node, transmission power information related to a first downlink (DL) signal;
   transmitting, to a child node, the first DL signal based on the transmission power information; and
   transmitting, to the parent node, a first uplink (UL) signal based on the transmission power information,
   wherein the first DL signal and the first UL signal are multiplexed based on (i) frequency division multiplexing (FDM) or (ii) spatial division multiplexing (SDM),
   wherein the transmission power information includes a maximum transmission power value of the first DL signal, and
   wherein a magnitude of transmission power of one of the first DL signal and the first UL signal is controlled to prevent a difference between the magnitude of the transmission power of the first DL signal and the magnitude of the transmission power of the first UL signal being equal to or larger than a threshold.

2. The communication method according to claim 1, wherein the one of the first DL signal and the first UL signal is configured by a higher-layer signal.

3. The communication method according to claim 1,
   wherein the transmission power information includes the type of the first DL signal to which the maximum transmission power value is applied, and
   wherein the type includes at least one of a DL signal for synchronization or a DL signal for channel measurement.

4. The communication method according to claim 1, further comprising:
   receiving, from the parent node, a transmission power value of a second DL signal; and
   receiving, from the parent node, the second DL signal transmitted with the transmission power value.

5. The communication method according to claim 4, wherein the transmission power value of the second DL signal is applied to a signal other than a DL signal for synchronization or a DL signal for channel measurement.

6. The communication method according to claim 1, wherein the relay node is an integrated access and backhaul (IAB) node.

7. A relay node used in a wireless communication system, comprising:
   a memory; and
   a processor,
   wherein the processor is configured to:
   receive, from a parent node, transmission power information related to a first downlink (DL) signal;
   transmit, to a child node, the first DL signal based on the transmission power information; and
   transmit, to the parent node, a first uplink (UL) signal based on the transmission power information, and
   wherein the first DL signal and the first UL signal are multiplexed based on (i) frequency division multiplexing (FDM) or (ii) spatial division multiplexing (SDM),
   wherein the transmission power information includes a maximum transmission power value of the first DL signal, and
   wherein a magnitude of transmission power of one of the first DL signal and the first UL signal is controlled to prevent a difference between the magnitude of the transmission power of the first DL signal and the magnitude of the transmission power of the first UL signal from being equal to or larger than a threshold.

8. The relay node according to claim 7, wherein the one of the first DL signal and the first UL signal is configured by a higher-layer signal.

9. The relay node according to claim 7,
   wherein the transmission power information includes the type of the first DL signal to which the maximum transmission power value is applied, and
   wherein the type includes at least one of a DL signal for synchronization or a DL signal for channel measurement.

10. The relay node according to claim 7, wherein the processor is configured to receive, from the parent node, a transmission power value of a second DL signal, and receive, from the parent node, the second DL signal transmitted with the transmission power value.

11. The relay node according to claim 10, wherein the transmission power value of the second DL signal is applied to a signal other than a DL signal for synchronization or a DL signal for channel measurement.

12. The relay node according to claim 7, wherein the relay node is an integrated access and backhaul (IAB) node.

* * * * *